(12) United States Patent
Birdi et al.

(10) Patent No.: US 7,728,477 B2
(45) Date of Patent: Jun. 1, 2010

(54) DUAL PURPOSE PERMANENT MAGNET EXCITER

(75) Inventors: Balwinder S. Birdi, Tucson, AZ (US); Michael W. Duddeck, Tucson, AZ (US); William M. Scherzinger, Tucson, AZ (US); Simon L. Waddell, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 286 days.

(21) Appl. No.: 11/945,081

(22) Filed: Jan. 17, 2008

(65) Prior Publication Data

US 2009/0184691 A1 Jul. 23, 2009

(51) Int. Cl.
*H02K 7/106* (2006.01)
*H02K 7/00* (2006.01)

(52) U.S. Cl. .......................... 310/94; 310/92; 310/112; 322/14; 322/44; 192/94; 192/54.51

(58) Field of Classification Search .................. 310/92, 310/94, 112, 102 R; 322/12, 4, 38, 441; 192/94, 54.51
See application file for complete search history.

(56) References Cited

U.S. PATENT DOCUMENTS

| | | | | |
|---|---|---|---|---|
| 3,733,505 A | * | 5/1973 | Kildishev et al. | ........... 310/112 |
| 4,315,442 A | * | 2/1982 | Cordner | ........................ 475/72 |
| 4,637,272 A | | 1/1987 | Teske | |
| 4,734,590 A | * | 3/1988 | Fluegel | ........................ 290/1 C |
| 5,028,803 A | * | 7/1991 | Reynolds | ..................... 290/31 |
| 6,455,975 B1 | | 9/2002 | Raad | |
| 6,707,205 B2 | * | 3/2004 | Johnsen | ..................... 310/114 |
| 6,808,052 B2 | * | 10/2004 | Kirkwood et al. | ............. 192/35 |
| 2004/0163919 A1 | | 8/2004 | Kirkwood | |
| 2005/0045445 A1 | * | 3/2005 | Van Heteren et al. | ......... 192/94 |
| 2005/0133331 A1 | * | 6/2005 | Howard | .................. 192/69.82 |
| 2009/0056498 A1 | * | 3/2009 | Birdi et al. | .................... 74/840 |
| 2009/0184691 A1 | * | 7/2009 | Birdi et al. | .................... 322/12 |
| 2009/0224727 A1 | * | 9/2009 | Burke et al. | .................. 322/40 |
| 2009/0224728 A1 | * | 9/2009 | Burke et al. | .................. 322/41 |

\* cited by examiner

*Primary Examiner*—Karl I Tamai
(74) *Attorney, Agent, or Firm*—Oral Caglar, Esq.

(57) ABSTRACT

A permanent magnet rotor of a generator is used to excite a electromagnet stator to generate electric power for the generator and to control a disengagement mechanism whereby the generator can disengage from an accessory, such as a gear box drive shaft, when the generator is not working properly. The permanent magnet is affixed to an outer ball screw which normally rotates with an inner ball screw that is operatively engaged to the accessory. An increased load to the electromagnet stator slows or stops rotation of the permanent magnet rotor and outer ball screw, causing the inner ball screw to move axially from the outer ball screw and away from an accessory and toward a re-settable lock.

20 Claims, 7 Drawing Sheets

DUAL PURPOSE PERMANENT MAGNET EXCITER

BACKGROUND OF THE INVENTION

The present invention generally relates to apparatus and methods for disengaging generators and other rotating machines from an accessory such as a gearbox and, more particularly, to apparatus and methods of disengaging the rotating machine by using the existing permanent magnet rotor and permanent magnet stator of the rotating machine.

In the aerospace industry, aircraft receive electric power from generators. A permanent magnet exciter/generator (PME/G) is an essential part of the modern brushless aircraft generator. The PME/G is used to produce power for generator control units (GCU) once the generator is rotated with the prime mover. The generators also have main rotors, main stators, exciter rotors and exciter stators.

Figure 1:
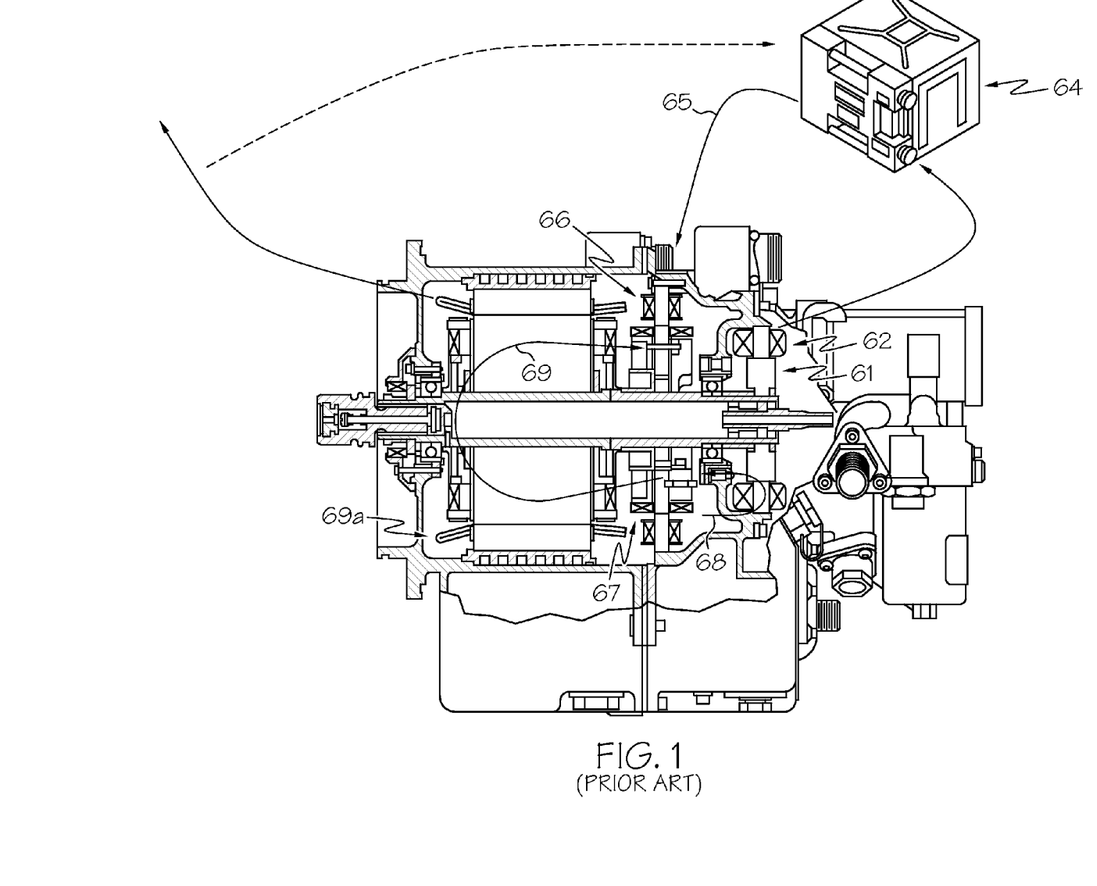
FIG. 1 is a sectional view of a generator of the prior art.
Figure 2:
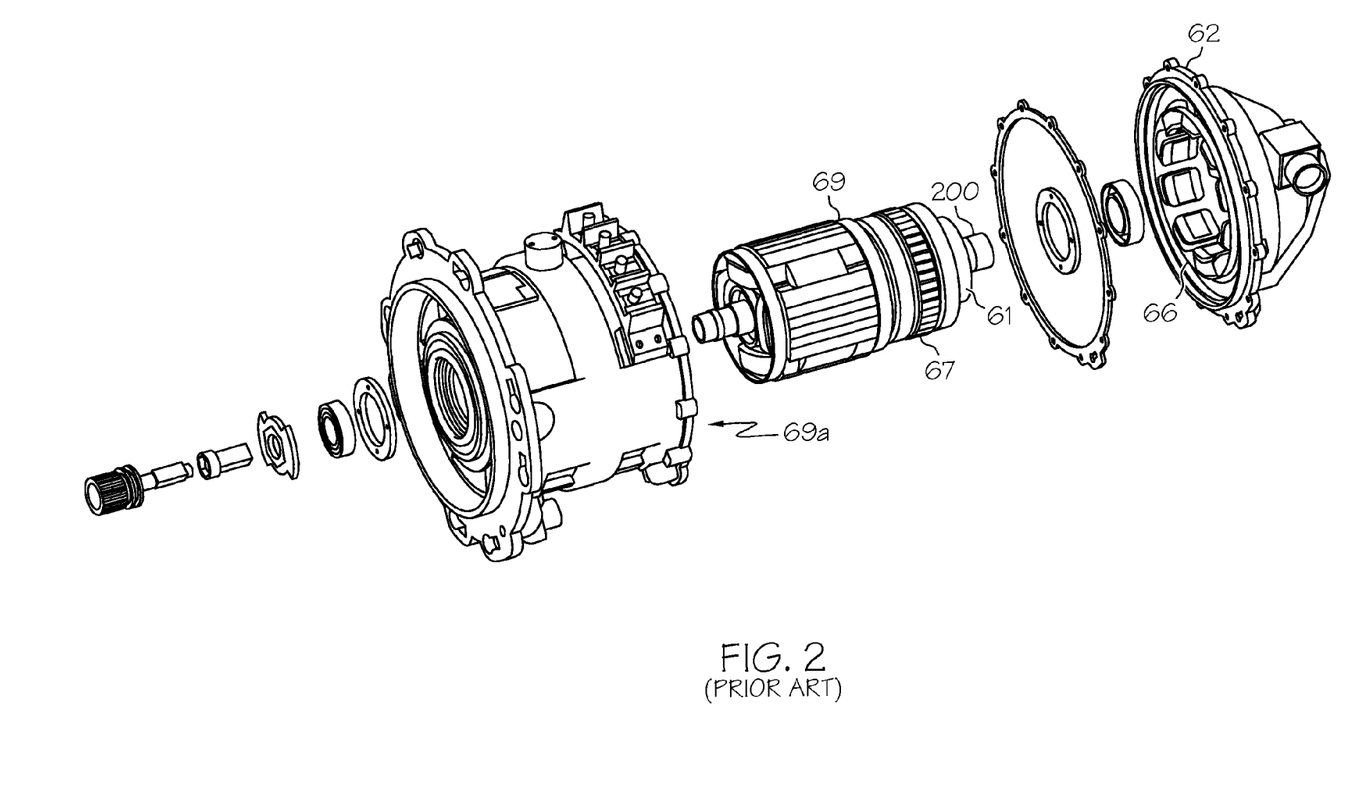
FIG. 2 is an exploded view of the prior art generator of FIG. 1.

FIG. 1 show the basic operation of a prior art generator. In this prior art generator a permanent magnet rotor 61 rotates inside the electromagnet stator 62 windings to produce AC power sent from the stator 62 to the Generator Control Unit (GCU) 64 which senses output voltage and controls exciter stator current to keep output voltage constant. DC current is sent via wires 65 to the exciter stator 66 creating a static magnetic field cut by rotating exciter rotor windings 67. Rotating diodes 68 rectify the AC exciter rotor output. DC current in the main rotor windings 69 create a rotating magnetic field producing power in the main stator conductors 69a which transmit AC power from the main stator. FIG. 2 shows an exploded view of the prior art generator, from which one can appreciate that there are three sets of rotor and stator all on a single generator drive shaft 200: the exciter rotor 67 with the exciter stator 66, the main rotor 69 with the main stator 69aa and the permanent magnet rotor 61 with its electromagnet stator 62.

The generators are coupled to the main engine or to auxiliary power units through the gear box. Known designs of generators have a generator drive shaft that includes some kind of shear section that is based on safe operational capability of the gearbox. In the event that the generator malfunctions, this shear section operates and protects the gear box from continuing to rotate under an unacceptable load from a malfunctioning generator that may have stopped rotating. For constant speed generators, the design of the shear section is not difficult—it is easy to design a shear section to meet one speed. However, with the evolution of variable frequency generators (VFG), where failure can occur over a range of speeds, it is rather difficult to design a shear section that can protect the gear box regardless of the multiple possible speeds of the generator.

It is therefore useful that some other means should be incorporated into the design of the generator that would help protect the gear box. If, for example, there is a minor fault with the generator and it is not producing any power but rather is rotating like a load on the gear box, it is desirable that the generator be de-coupled from the gear box.

As can be seen, there is a need to de-couple the generator from the gear box as needed when the generator malfunctions. Furthermore, there is a need to have such a de-coupling mechanism that is re-settable by the operator or maintenance personnel of the aircraft when the problem with the generator is fixed or addressed. It is also required that the disconnect mechanism not disengage unnecessarily and not inadvertently engage when disconnected

SUMMARY OF THE PRESENT INVENTION

In one aspect of the present invention, there is presented an assembly for a rotating machine, comprising: a stator subjected to an electric load during normal operation of the rotating machine; an inner ball screw operatively engaged to the rotating machine, the inner ball screw capable of engaging and disengaging an accessory; an outer ball screw surrounding the inner ball screw, the outer ball screw having affixed thereto a permanent magnet capable of exciting the stator to generate electric power for the rotating machine; and an angled ball track between the inner ball screw and the outer ball screw, wherein rotation of the outer ball screw slows or stops upon application of an increased electric load to the stator so that the inner ball screw rotates relative to the outer ball screw along the angled ball track and moves axially away from the accessory thereby disengaging the rotating machine from the accessory.

In a further aspect of the invention, there is presented a method of using a permanent magnet rotor and a electromagnet stator of a rotating machine to generate electric power for the rotating machine and to disconnect the rotating machine from an accessory, comprising: rotating a permanent magnet rotor structure in relation to a electromagnet stator to generate electric power for the rotating machine that is fed to a control unit controlling an electric load on the electromagnet stator; positioning an inner ball screw inside the permanent magnet rotor structure so that the inner ball screw rotates together with the permanent magnet rotor structure when the rotating machine is working properly, the inner ball screw connected to the rotating machine; engaging an accessory with the inner ball screw; increasing the electric load to the permanent magnet stator to slow or stop rotation of the permanent magnet rotor so that the inner ball screw rotates relative to the permanent magnet rotor structure and thereby moves axially away from the accessory to disengage the rotating machine from the accessory.

In another aspect of the invention, there is presented an assembly for generating electric power for a rotating machine and for disengaging the rotating machine from an accessory, the assembly comprising: a coupler between the accessory and the rotating machine, the coupler operatively engaged to the rotating machine and capable of engaging and disengaging the accessory; a permanent magnet rotor affixed to and rotating with the coupler, the permanent magnet rotor also situated relative to a electromagnet stator so as to excite the electromagnet stator to generate electric power for the rotating machine;

the electromagnet stator being subject to an electric load whose magnitude determines whether the coupler remains engaged to the accessory.

These and other features, aspects and advantages of the present invention will become better understood with reference to the following drawings, descriptions and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a disengagement assembly/mechanism for a rotating machine, such as an aircraft generator, for disengaging the generator from a gear box using the permanent magnet rotor and electromagnet stator already existing in the generator. Typically the drive shaft of the generator may be rotating and operatively engaged to the drive shaft of the gear box. When the generator is not working properly, for example in an aircraft, the disengagement mechanism may allow the pilot to disengage the generator from the gear box. The permanent magnet in the generator may serve the dual purpose of generating electric power for the generator and triggering the disengagement mechanism. When the pilot of an aircraft notices that the generator is not working properly or that it needs to be disengaged, the pilot can actuate a switch manually which causes the generator control unit to increase the electric load on the stator of the permanent magnet, thereby triggering the disconnect mechanism. The disengagement mechanism may be re-settable manually on the ground, presumably after the aircraft lands and the functioning of the generator has been investigated and, if necessary, fixed.

In contrast to the prior art, which does not use a ball screw mechanism, the disengagement assembly of the present invention utilizes an efficient and reliable ball screw mechanism including an inner ball screw, an outer ball screw, a ball track and ball bearings. This ball screw mechanism of the present invention may serve to maintain minimal internal friction, as opposed to other prior art disengagement mechanisms, for example a screw type drive and clutch mechanism. In further contrast to the prior art, in which the disconnect mechanism has to self-destruct in order to function, the disengagement assembly of the present invention may be re-usable and re-settable. In addition, while the prior art makes use of new equipment not found in the generator for the disconnect mechanism, the present invention exploits the existing permanent magnet and its stator already in the generator to trigger the disconnect mechanism that separates the generator from the accessory, i.e. gear box.

Figure 3:
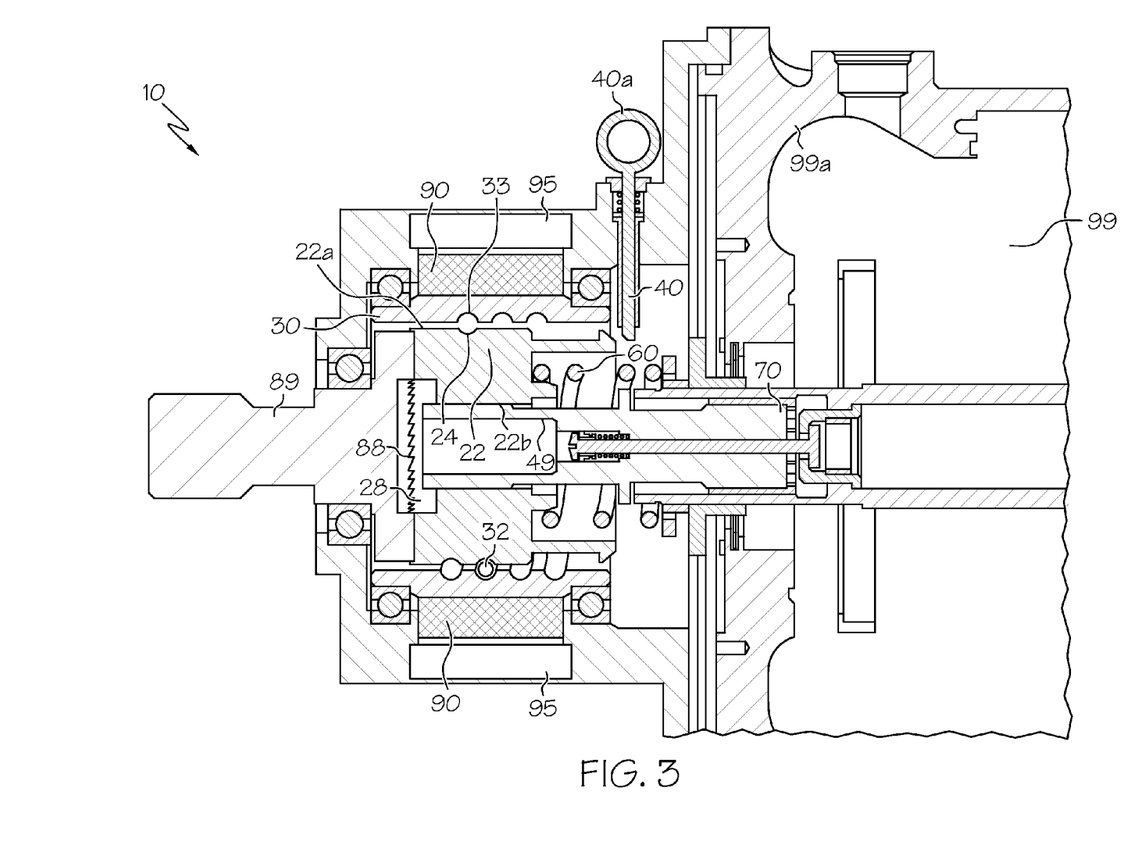
FIG. 3 is a sectional view of the assembly of the present invention in the environment of a generator and a gear box drive shaft wherein the generator is in its normal state engaged to the gear box.

As seen from FIG. 3, an assembly 10 of the present invention may utilize a permanent magnet rotor 90 and electromagnet stator 95 to trigger a disengagement mechanism for disengaging a variable frequency generator 99 from a gear box (not shown except for gear box drive shaft adaptor 89). Disconnect/disengagement assembly 10 may include a rotatable inner ball screw 22 that has an angled threading 24 on an outer surface 22a of inner ball screw 22.

Since inner ball screw 22, which may function as the inner part of a ball screw, may be hollow, inner ball screw 22 may surround and may be operatively engaged to a generator drive shaft 70 so that the rotation of generator drive shaft 70 may cause rotation of inner ball screw 22. In this regard, there may be radially protruding splines 49 between the surface of generator drive shaft 70 and inner surface 22b of inner ball screw 22. The splines 49, or another suitable structure may serve to transfer the rotational force of the generator drive shaft 70 to inner ball screw 22.

Inner ball screw 22 may have a mating structure 28, such as axial teeth, at an end distal to the generator 99. This mating structure 28 may be normally engaged to a corresponding mating structure 88 of an accessory, in this case the accessory being the gear box drive shaft. The gear box drive shaft that is shown in the drawings is called the gear box drive shaft adaptor 89. This mating structure 28 may include axial dog teeth or angled teeth 28 on inner ball screw 22 in which case the corresponding mating structure 88 of the gear box drive shaft adaptor 89 may also include the mating dog teeth 88 or angled teeth 88 that mate with axial teeth 28.

Disengagement assembly 10 may also include an outer ball screw 30 which may surround and normally rotates with inner ball screw 22. As seen in FIG. 3, outer ball screw 30 may have associated with it one or more balls 32, called ball bearings, that travel on the angled ball track 34 that exists between the inner ball screw 22 and outer ball screw 30. In one exemplary embodiment, there may be between approximately five and seven such balls depending upon the design requirement. The angled ball track 34 may be formed from threading 24 on the inner ball screw 22 and outer threading 33 on a lower side of outer ball screw 30. The fact that the ball track 34 may be angled means that ball track 34 may have some axial component rather than simply being a series of revolutions around inner ball screw 22.

As seen from FIG. 3, when outer ball screw 30 (or permanent magnet rotor structure 93) slows or stops, inner ball screw 22 may rotate relative to outer ball screw 30 along angled ball track 34 and may move axially away from the accessory thereby disengaging the rotating machine 99 from the accessory.

Figure 4:
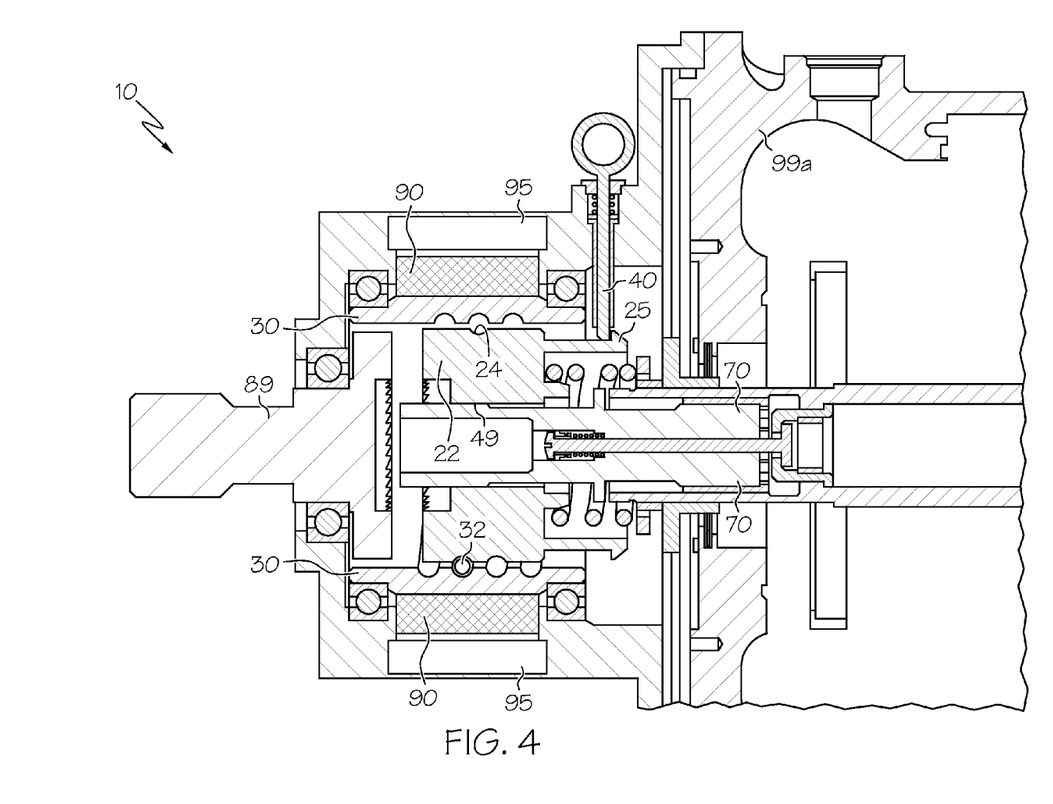
FIG. 4 is a sectional view of the assembly of FIG. 3 in the environment of a generator and a gear box drive shaft wherein the inner ball screw has been disengaged from the gear box drive shaft.

As seen in FIG. 4, since normally inner ball screw 22 may rotate together with outer ball screw 30, this slowing or stopping of the rotation of outer ball screw 30 may cause inner ball screw 22 to rotate relative to outer ball screw 30 along ball track 34 and simultaneously slide axially away from the gear box drive shaft adaptor 89 (which may also mean sliding toward lock 40) thereby disengaging the generator 99 from the gear box drive shaft adaptor 89. When inner ball screw 22 slides axially away from gear box drive shaft adaptor 89, inner ball screw 22 may be sliding on generator drive shaft 70, and more precisely on splines 49 between the surface of generator drive shaft 70 and inner surface 22b of inner ball screw 22. Accordingly, outer ball screw 30 may be capable of rotation and inner ball screw 22 may be capable of both rotation and side to side movement.

Outer ball screw 30 may have affixed thereto a permanent magnet rotor 90. When permanent magnet rotor 90 rotates, it may be capable of exciting a permanent magnet stator 95 in order to generate AC electric power for the rotating machine. The AC electric power created by the permanent magnet rotor 90 and permanent magnet stator 95 in the assembly 10 of the present invention may be converted to DC power and then re-converted to AC power output. In other words, as seen from FIG. 6, permanent magnet rotor 90 and stator 95 may interact with an exciter rotor 107 and exciter stator 106 and a main rotor 109 and main stator 109a to produce electric power for generator 99.

Figure 6:
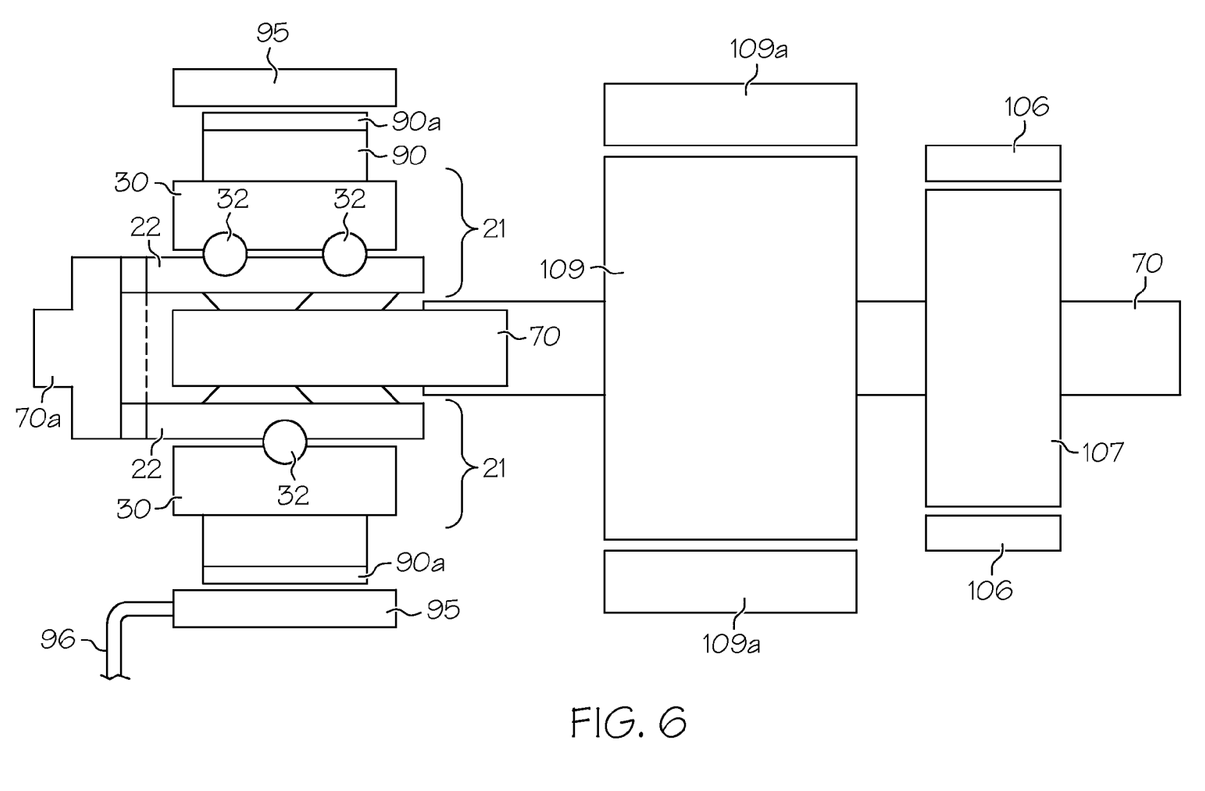
FIG. 6 is a schematic diagram of the assembly of the present invention in the environment of a generator and accessory.

Outer ball screw 30 may serve as a base for permanent magnet 90. Accordingly, as seen from FIG. 5, a permanent magnet rotor structure 93 may be defined as comprising outer ball screw 30 together with permanent magnet 90.

electromagnet stator 95 may be wired to generator control unit ("GCU") (not shown in the figures for the present invention) of generator 99 via wires 96 (see FIG. 6). Accordingly, electromagnet stator 95 may be ordinarily subject to an electric load controlled by the GCU. As seen from FIG. 6, permanent magnet 90 may include band 90a to hold permanent magnet 90.

As seen from FIG. 6, wherein the rotating machine is generator 99 of the present invention, generator drive shaft 70 may have the exciter rotor 107 and its stator 106, the main rotor and its stator and the permanent magnet rotor 90 with its stator 95 all positioned on the same drive shaft 70 (drive shaft 70 may have a stub shaft 70a projecting there from). As such, permanent magnet 90 and stator 95 may be the primary source for generating electric power for the generator along with the main rotor 109, main stator 109a, exciter rotor 107 and exciter stator 106.

The speed of the rotation of permanent magnet rotor 90 may be affected by the magnetic flux generated by the electric load of stator 95. When the generator is operating normally, the electric load on electromagnet stator 95 may be set so that the speed of the rotation of permanent magnet 90 is unaffected by the electric load. However, when the electric load on stator 95 exceeds a certain threshold magnitude ("TM"), the increased magnetic flux may slow or stop rotation of permanent magnet 90. The magnitude of the electric load on stator 95 from the GCU are easily calculated by those skilled in the art so that the electric load may be set as needed to trigger the disengagement mechanism of the present invention.

The increased electric load on the electromagnet stator may be accomplished in any number of ways known to those skilled in the art. Purely by way of example, the increased electric load on electromagnet stator 95 may be effectuated by causing a shorting of the coil of electromagnet stator 95.

Since permanent magnet 90 may be rigidly affixed to outer ball screw 30, they may rotate together and when one slows the other may slow. Consequently, outer ball screw 30 may be capable of slowing or stopping rotation upon application of an increased electric load to electromagnet stator 95 which slows or stops permanent magnet 90. The increased load referred to may be a pre-calculated electric load designed to exceed the threshold magnitude TM under which the speed of rotation of permanent magnet 90 is unaffected by the electric load.

The GCU, which controls the electric load on electromagnet stator 95, may be connected to a switch that is remotely actuatable by an operator when generator 99 is not working properly. Other arrangements may easily be envisioned whereby the GCU may be controlled directly or indirectly by other mechanisms.

The disconnect mechanism 10 may also include locking mechanism 40 for locking inner ball screw 22 in place after inner ball screw 22 has moved laterally/axially away from gear box drive shaft adaptor 89 to disengage generator 99 from the gear box.

Figure 5:
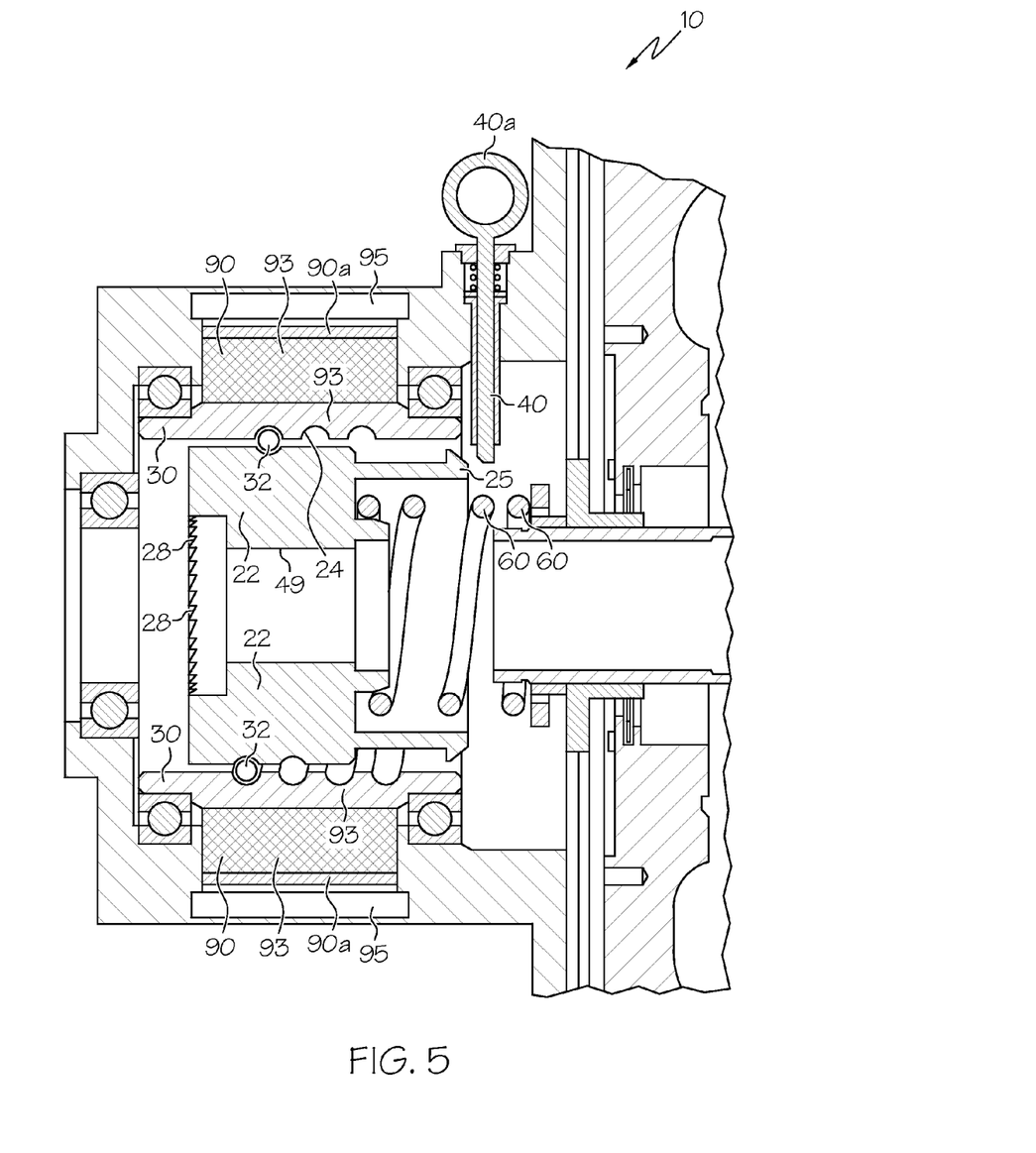
FIG. 5 is a sectional view of the assembly of the present invention.

As seen in FIG. 5, one example of lock mechanism 40 is shown whereby the lock may be a simple key or pin 40a whose bottom is urged up momentarily by a slanted back shoulder 25 at a proximal end of inner ball screw 22, and then falls back down once slanted back tooth 25 passes key 40a, thereby ensuring that inner ball screw 22 may be held in place by lock 40 (i.e. cannot reverse direction) until key 40a is re-set. The re-setting of lock 40 may be performed manually by an operator which may be achieved manually on the ground by releasing lock 40 such as by causing key 40a to be lifted. This may allow springs 60 (see below) to push inner ball screw 22 back to its normal position engaged to the accessory.

After the rotating machine is disengaged form the accessory, a lock 40 may hold inner ball screw 22 to prevent inner ball screw 22 from re-engaging the accessory.

Since inner ball screw 22 may constantly vibrate together with the accessory, for example on an airplane, it may be helpful to maintain a minimal axial load on inner ball screw 22 to prevent erosion at the point of contact between them. In order to maintain a minimal axial load (as one example, approximately 60 pounds) on inner ball screw 22, disengagement assembly 10 may include springs 60 at a proximal end of inner ball screw 22. Springs 60 may serve to urge inner ball screw 22 toward the accessory, i.e. gear box drive shaft adaptor 89. Accordingly, when inner ball screw 22 has been locked by key 40a and lock 40 is later manually released, inner ball screw 22 may automatically revert to its normal position being engaged to gear box drive shaft adaptor 89 by rotating through ball track 34 in a reverse direction and sliding axially so that axial dog teeth 28 meet corresponding axial teeth 88 of gear box drive shaft adaptor 89. Generator 99 may then re-engaged to the gear box for future normal operation.

As seen from FIG. 6, the inner ball screw 22 and outer ball screw 30 may together be viewed as a coupler 21 located between the rotating machine and the accessory gearbox wherein inner ball screw 22 may move relative to outer ball screw 30. Coupler 21 may be operatively engaged to rotating machine 99 and may be capable of engaging and disengaging the accessory depending upon the load to electromagnet stator 95. Permanent magnet rotor 90 may be affixed to and normally rotating with the coupler 21 (and in particular to outer ball screw 30) when rotating machine 99 is working properly. When rotating machine 99 is not working properly, and an increased load to stator 95 has been applied, inner ball screw 22 may disengage from the accessory and permanent magnet rotor 90 may not be rotating at the same speed as inner ball screw 22 of coupler 21. Since permanent magnet rotor 90 may be situated relative to electromagnet stator 95 so as to excite electromagnet stator 95 to generate electric power for the rotating machine, electromagnet stator 95 may be subject to an electric load from the GCU (via wires 96) whose magnitude determines whether coupler 21 remains engaged to the accessory. Coupler 21 may optionally also include a ball cage that keeps ball 32 at a particular location which helps operation of disengagement assembly 10.

Although as seen from FIGS. 3-4, the entire disconnect mechanism 10 may be outside of a housing 99a of generator 99 and may have its own housing 98 (see FIG. 5), it is also contemplated by the present invention that, in certain embodiments, disengagement/disconnect assembly 10 may also be subsumed within and utilize housing 99a of generator 99.

Under certain conditions, disengagement/disconnect assembly 10 need not include a lock 40. In such a case, re-engagement of the rotating machine with the accessory may occur when the electric load on electromagnet stator 95 may be re-set or reduced to a magnitude allowing a resumption or speeding up of the rotation of outer ball screw 30 to occur to the point where outer ball screw 30 rotates again with inner ball screw 22.

Figure 7:
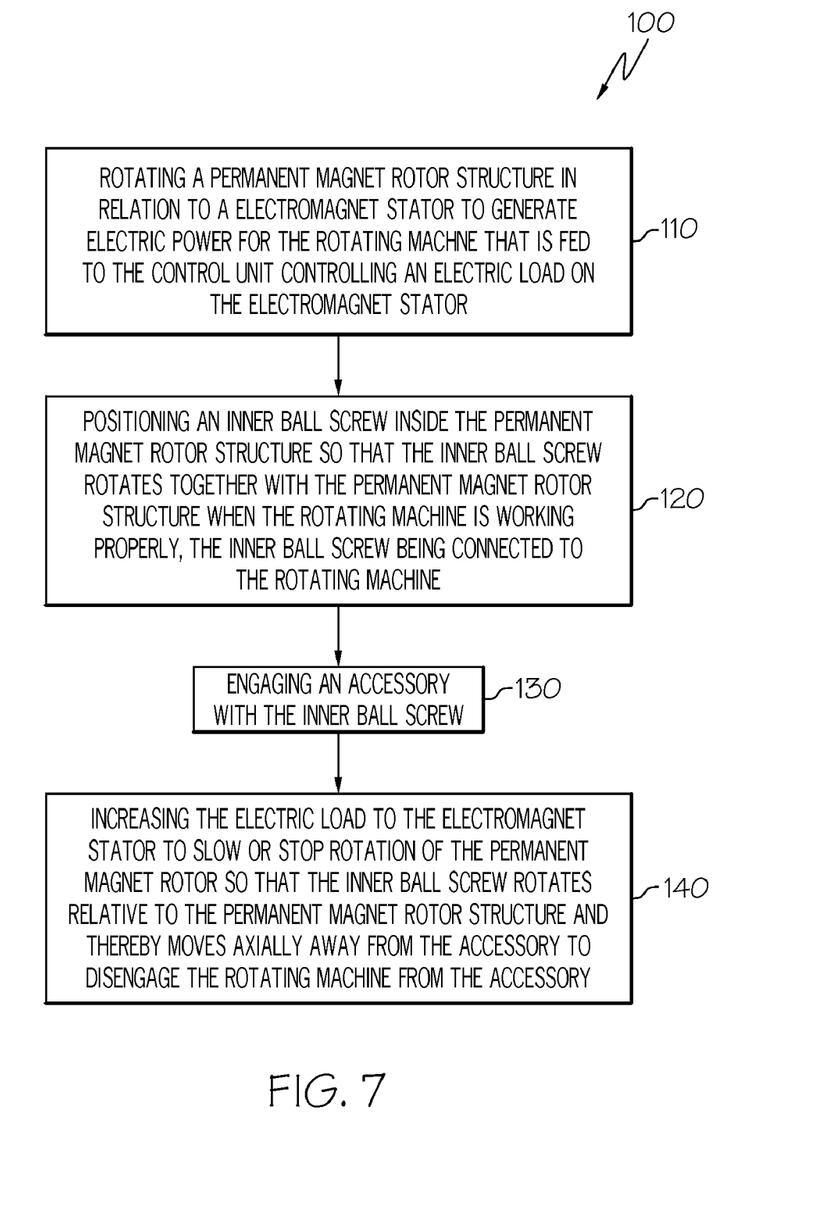
FIG. 7 is a flow chart showing a method of the present invention.

As can be seen from FIG. 7, which is a flow chart, the present invention also envisions a method 100 of using a permanent magnet rotor 90 and a electromagnet stator of a rotating machine to serve two or more functions. Method 100 may include a step 110 of rotating a permanent magnet rotor structure 93 in relation to a electromagnet stator 95 to generate electric power for the rotating machine 99 that is fed to the generator control unit controlling an electric load on the electromagnet stator 95. Method 100 may include a further step 120 of positioning an inner ball screw 22 inside the permanent magnet rotor structure 93 so that inner ball screw 22 may rotate together with the permanent magnet rotor structure 93 when rotating machine 99 is working properly, the inner ball screw 22 being connected to rotating machine 99. It should be understood that when speaking of positioning inner ball screw 22 "inside" the permanent magnet rotor structure 93, the term "inside" may mean "on the inner side of" so that it refers to inner ball screw 22 being closer to drive shaft 70 of rotating machine (since permanent magnet rotor structure 93 may be hollow) or closer to an imaginary axis running through permanent magnet rotor structure 93.

Method 100 may also include step 130 of engaging an accessory with the inner ball screw 22. In addition, method 100 may also include a step 140 of increasing the electric load (so that it exceeds a threshold magnitude) to electromagnet stator 95 to slow or stop rotation of permanent magnet rotor 90 so that inner ball screw 22 may rotate relative to permanent magnet rotor structure 93 and inner ball screw 22 thereby may move axially away from the accessory to disengage rotating machine 99 from the accessory.

The present invention may also be viewed as a method using a permanent magnet 90 of a rotating machine 99 to disengage rotating machine 99 from an accessory. The method may include a step of engaging the accessory with inner ball screw 22 connected to rotating machine 99. This method may also include a further step of positioning on inner ball screw 22 an outer ball screw 30 having permanent magnet 90 affixed to outer ball screw 30 so that the outer and inner ball screws rotate together and so that the permanent magnet 90 simultaneously excites electromagnet stator 95, which participates in generating electric power for the rotating machine 99. Since electromagnet stator 95 may be subjected to an electric load controlled by the GCU, this method may further include a step of applying an increased electric load to stator 95 to slow or stop rotation of permanent magnet 90 and outer ball screw 30 so that inner ball screw 22 rotates relative to outer ball screw 30 and thereby moves axially away from the accessory to disengage rotating machine 99 from the accessory.

It should be understood, of course, that the foregoing relates to exemplary embodiments of the invention and that modifications may be made without departing from the spirit and scope of the invention as set forth in the following claims.

We claim:

1. An assembly for a rotating machine, comprising:
    a stator subjected to an electric load during normal operation of the rotating machine;
    an inner ball screw operatively engaged to the rotating machine, the inner ball screw capable of engaging and disengaging an accessory;
    an outer ball screw surrounding the inner ball screw, the outer ball screw having affixed thereto a permanent magnet capable of exciting the stator to generate electric power for the rotating machine; and
    an angled ball track between the inner ball screw and the outer ball screw, wherein
    rotation of the outer ball screw slows or stops upon application of an increased electric load to the stator so that the inner ball screw rotates relative to the outer ball screw along the angled ball track and moves axially away from the accessory thereby disengaging the rotating machine from the accessory.

2. The assembly of claim 1, further comprising a lock capable of preventing the inner ball screw from re-engaging the accessory after the inner ball screw has disengaged from the accessory.

3. The assembly of claim 2, wherein the lock is re-settable.

4. The assembly of claim 1, wherein the increased load to the stator is remotely actuatable by an operator when the rotating machine is not working properly.

5. The assembly of claim 1, wherein the increased load to the stator is accomplished by shorting a coil of the stator.

6. The assembly of claim 1, wherein the inner ball screw has axial dog teeth and wherein a drive shaft of the accessory has dog teeth that mate with the axial dog teeth.

7. A method of using a permanent magnet rotor and a electromagnet stator of a rotating machine to generate electric power for the rotating machine and to disconnect the rotating machine from an accessory, comprising:
    rotating a permanent magnet rotor structure in relation to a electromagnet stator to generate electric power for the rotating machine that is fed to a control unit controlling an electric load on the electromagnet stator;
    positioning an inner ball screw inside the permanent magnet rotor structure so that the inner ball screw rotates together with the permanent magnet rotor structure when the rotating machine is working properly, the inner ball screw connected to the rotating machine;
    engaging an accessory with the inner ball screw;
    increasing the electric load to the electromagnet stator to slow or stop rotation of the permanent magnet rotor so that the inner ball screw rotates relative to the permanent magnet rotor structure and thereby moves axially away from the accessory to disengage the rotating machine from the accessory.

8. The method of claim 7, wherein the permanent magnet rotor and permanent magnet stator interact with a main rotor, a main stator, an exciter rotor and an exciter stator to generate the electric power for the rotating machine.

9. The method of claim 7, wherein positioning the inner ball screw inside the permanent magnet rotor structure involves positioning the inner ball screw inside an outer ball screw forming part of the permanent magnet rotor structure.

10. The method of claim 7, further comprising preventing the inner ball screw from re-engaging the accessory by applying a lock after the rotating machine is disengaged form the accessory.

11. The method of claim 7, including maintaining a minimal axial load on the inner ball screw by urging the inner ball screw toward the accessory with springs at a proximal end of the inner ball screw.

12. The method of claim 11, including re-engaging the rotating machine with the accessory by means of the springs upon re-setting the electric load.

13. The method of claim 7, wherein the inner ball screw rotates relative to the permanent magnet along an angled ball track between the inner ball screw and the permanent magnet.

14. An assembly for generating electric power for a rotating machine and for disengaging the rotating machine from an accessory, the assembly comprising:
    a coupler between the accessory and the rotating machine, the coupler operatively engaged to the rotating machine and capable of engaging and disengaging the accessory;

a permanent magnet rotor affixed to and rotating with the coupler, the permanent magnet rotor also situated relative to a electromagnet stator so as to excite the electromagnet stator to generate electric power for the rotating machine;

the electromagnet stator being subject to an electric load whose magnitude determines whether the coupler remains engaged to the accessory.

15. The assembly of claim 14, wherein the coupler is operatively engaged to the accessory until the electromagnet stator is subject to an increased electric load of a certain magnitude.

16. The assembly of claim 14, wherein the coupler includes an outer ball screw to which the permanent magnet is affixed and wherein the coupler includes an inner ball screw.

17. The assembly of claim 16, including springs that urge the inner ball screw toward the accessory thereby keeping a minimal axial load on the inner ball screw.

18. The assembly of claim 14, wherein an increased electric load to the electromagnet stator causes the inner ball screw to move axially toward the accessory.

19. The assembly of claim 14, further comprising a resettable lock capable of preventing the coupler from re-engaging the accessory after the coupler has disengaged from the accessory.

20. The assembly of claim 14, wherein a threshold magnitude of the electric load to the stator is pre-calculated and governed by a generator control unit outside the generator.

* * * * *